US011232055B2

(12) United States Patent
Buenaventura et al.

(10) Patent No.: US 11,232,055 B2
(45) Date of Patent: Jan. 25, 2022

(54) ADDRESSING OF SLAVE DEVICES USING INTERATIVE POWER ACTIVATION

(71) Applicant: Schneider Electric Industries SAS, Rueil Malmaison (FR)

(72) Inventors: Felipe Castillo Buenaventura, Angoulême (FR); Pablo Garcia Viano, Magnac-sur-Touvre (FR); Gregory Molina, Ruelle-sur-Touvre (FR); Loïc Caseras, Dirac (FR); Benjamin Plessis, Novena (SG)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 16/942,056

(22) Filed: Jul. 29, 2020

(65) Prior Publication Data
US 2021/0049121 A1  Feb. 18, 2021

(30) Foreign Application Priority Data
Aug. 14, 2019  (EP) ...................................... 19306012

(51) Int. Cl.
*G06F 13/362* (2006.01)
*G06F 11/07* (2006.01)
(Continued)

(52) U.S. Cl.
CPC ........ *G06F 13/362* (2013.01); *G06F 11/0772* (2013.01); *G06F 11/3058* (2013.01); *G06F 13/37* (2013.01)

(58) Field of Classification Search
CPC .............. G06F 13/362; G06F 12/0653; G06F 12/0669; G06F 2213/0052
See application file for complete search history.

(56) References Cited

U.S. PATENT DOCUMENTS 5,586,269 A * 12/1996 Kubo .................. G06F 12/0669
                                                    340/3.5
5,814,771 A    9/1998 Oakes et al.
(Continued)

FOREIGN PATENT DOCUMENTS

EP        3139574       3/2017
EP        3454532       3/2019
WO    WO2003085899    10/2003

OTHER PUBLICATIONS

Extended European Search Report for EP Patent Application No. 19306012.6 dated Jan. 24, 2020, 8 pages.

*Primary Examiner* — Raymond N Phan
(74) *Attorney, Agent, or Firm* — Locke Lord LLP

(57) ABSTRACT

A method for addressing a slave device in a network system comprising a master device and a plurality of slave devices. The slave devices have a common default address in an unaddressed state and the master device and the plurality of slave devices are connected in chain via a power line and a communication line,
wherein each slave device is indexed by an index greater than or equal to 1, the slave device of index 1 being connected to the master device,
wherein, to address the slave device of index k, k being equal to or greater than 2, the method first instructs the slave device of index k−1 to activate the power supply of the slave device of index k via the power line, and then, it sends, to the common default address on the communication line, a command to change the common default address of the slave device of index k to a unique address of index k. Therefore, at each iteration, there is only one unaddressed slave device in the network.

11 Claims, 4 Drawing Sheets

(51) Int. Cl.
*G06F 11/30* (2006.01)
*G06F 13/37* (2006.01)

(56) References Cited

U.S. PATENT DOCUMENTS

| | | | | |
|---|---|---|---|---|
| 6,397,280 | B1* | 5/2002 | Nitschke | H04L 12/403 |
| | | | | 709/208 |
| 2003/0065730 | A1* | 4/2003 | Jones | H04L 12/403 |
| | | | | 709/208 |
| 2007/0040657 | A1* | 2/2007 | Fosler | H02M 3/33515 |
| | | | | 340/333 |
| 2007/0073446 | A1* | 3/2007 | Sequiera | H02J 1/14 |
| | | | | 700/292 |
| 2007/0294443 | A1* | 12/2007 | Berenbaum | G06F 13/42 |
| | | | | 710/104 |
| 2008/0135378 | A1* | 6/2008 | Mignano | B65G 17/345 |
| | | | | 198/370.06 |
| 2008/0140899 | A1* | 6/2008 | Oh | G06F 12/0653 |
| | | | | 710/300 |
| 2010/0185841 | A1* | 7/2010 | Monreal | G06F 13/37 |
| | | | | 713/2 |
| 2010/0274945 | A1 | 10/2010 | Westrick, Jr. et al. | |
| 2012/0215874 | A1* | 8/2012 | Sequeira | H04L 41/0889 |
| | | | | 709/208 |
| 2012/0239841 | A1* | 9/2012 | Trifonov | G06F 13/4282 |
| | | | | 710/110 |
| 2013/0210371 | A1* | 8/2013 | Hashimoto | H04W 24/06 |
| | | | | 455/67.14 |
| 2015/0355610 | A1* | 12/2015 | Petrocy | G05B 19/0421 |
| | | | | 700/20 |
| 2017/0070564 | A1 | 3/2017 | Sinistro et al. | |
| 2017/0083467 | A1* | 3/2017 | Mishra | G06F 13/362 |
| 2018/0143935 | A1* | 5/2018 | Cox | G06F 13/4221 |
| 2018/0219582 | A1 | 8/2018 | Scott et al. | |
| 2020/0073836 | A1* | 3/2020 | Graif | G06F 1/10 |
| 2020/0125520 | A1* | 4/2020 | Perchlik | G06F 13/4022 |
| 2020/0171900 | A1* | 6/2020 | Pampattiwar | H01R 13/665 |

\* cited by examiner

ADDRESSING OF SLAVE DEVICES USING INTERATIVE POWER ACTIVATION

BACKGROUND

The present invention relates to network systems comprising serial bus slave devices controlled by a master device. In particular, it concerns allocation of addresses to the slave devices during a configuration phase, such as during start-up of the network system for example.

In wired communication networks, there is indeed a need to assign addresses to slave devices (or nodes) that are present/added in the network.

This can be performed manually but this solution is long, prone to input errors and requires expertise by the operator manually addressing the slave devices.

To overcome this, some prior art methods, such as the ones described in patent applications US 2010/0274945, EP 3139574A1 and WO 03/085899, use self-addressing mechanisms to assign addresses to slave devices.

Referring to FIG. 1, there are shown slave devices 101.1, 101.2 and 101.3 of a network system according to the prior art.

The slave devices 101 are connected via a communication bus comprising two communication lines 102 and 103. Each slave device 101 also comprises respective switches 104 and 105 to disconnect the next slave device from each of the communications lines 102 and 103.

According to these solutions, the bus switching mechanism is implemented on the communication bus itself.

The solutions of the prior art have the following disadvantages:
- they rely on switching between communication lines 102 and 103, which is technically complex due to signal integrity issues that a switch 104/105 on the signal line adds intrinsically. This implies that the technical implementation is costly;
- switching between communication lines 102 and 103 makes it difficult to detect a faulty slave device in the chain of slave devices.

The proposed solutions overcome at least some of the above disadvantages.

SUMMARY OF INVENTION

It is an object of the invention to alleviate at least some of the disadvantages mentioned above.

A first aspect of the invention concerns a method for addressing a slave device in a network system comprising a master device and a plurality of slave devices. The slave devices have a common default address in an unaddressed state and the master device and the plurality of slave devices are connected in chain via a power line and a communication line.

Each slave device is indexed by an index greater than or equal to 1, the slave device of index 1 being connected to the master device, and, to address the slave device of index k, k being equal to or greater than 2, the method comprises the following operations performed by the master device:
- instructing, via the communication line, the slave device of index k−1 to activate the power supply of the slave device of index k via the power line;
- sending, to the common default address on the communication line, a command to change the common default address of the slave device of index k to a unique address of index k.

Such an iterative process allows addressing one unaddressed slave device at a time, which allows efficiently detecting and activating the slave devices. Indeed, at each iteration, there is only one unaddressed slave device in the network. It also makes it easy to detect a faulty slave device.

According to some embodiments, after activation of the slave device of index k, the method may comprise measuring a value of a current consumption on the power line, and, based on a comparison between the measured value and a previous value, determining whether the slave device of index k is correctly activated or not.

Therefore, the detection of a fault is performed efficiently and at a lower cost, as it only requires measuring the current drawn on the power line at each iteration.

As a complement, the command to change the common default address of the slave device of index k may be sent if the difference between the measured value and the previous value is substantially different from zero.

This ensures to perform the addressing step only if a new slave device is detected, thereby improving the efficiency of the method.

Alternatively, or in complement, the command to change the common default address of the slave device of index k may be sent if the difference between the measured value and the previous value is within a predetermined range, else the master device issues an error message.

This allows to easily and efficiently detect an error in the chain of slave device, and probably in the slave device of index k.

According to some embodiments, for the slave device of index 1, the method may comprise the following operations:
- measuring the current consumption on the power line and storing said current consumption as a previous value;
- activating the slave device of index 1 via the power line;
- measuring the current consumption on the power line after the slave device of index 1 has been activated.

This allows defining a reference current consumption value on the power line, and therefore increasing the accuracy of the detection of failure.

According to some embodiments, the command to change the common default address of the slave device of index k may be sent if an acknowledgment has been received from the slave device of index k−1 following the instruction sent on the communication line.

This enables to send the command only when the slave device of index k−1 has confirmed that the activation of the slave device of index k is effective, thereby improving the efficiency of the method.

According to some embodiments, the method may further comprise sending a presence query to the unique address of index k, and, upon receiving of an acknowledgment to the presence query from the slave device of index k, repeating the operations of the method for the slave device of index k+1.

This enables to iterate the method only when the slave device of index k has been correctly registered.

According to some embodiments, the unique address of index k may be a code determined based on index k.

A second aspect of the invention concerns a non-transitory computer readable storage medium, with a computer program stored thereon, the computer program comprising instructions for, when executed by a processor, carrying out the steps of a method according to the first aspect of the invention.

A third aspect of the invention, a master device for addressing a slave device in a network system comprising the master device and a plurality of slave devices, wherein the slave devices have a common default address in an unaddressed state, the master device comprising:
a first interface to access a power line for powering the slave devices;
a second interface for communicating with the slave devices via a communication line;
wherein each slave device being indexed by an index greater than or equal to 1, the master device being connected to the slave device of index 1
wherein the master device comprises a processor that implements, for addressing the slave device of index k, k being equal to or greater than 2, the following operations:
instructing, via the communication line, the slave device of index k−1 to activate the power supply of the slave device of index k via the power line;
sending, to the common default address on the communication line, a command to change the common default address of the slave device of index k to a unique address of index k.

A fourth aspect of the invention concerns a system comprising a master device according to the third aspect and a plurality of slave devices connected in chain to the master device.

Further objects, aspects, effects and details of the invention are described in the following detailed description of number of exemplary embodiments, with reference to the drawings.

BRIEF DESCRIPTION OF DRAWINGS

By way of example only, the embodiments of the present disclosure will be described with reference to the accompanying drawing, wherein.

DETAILED DESCRIPTION

Figure 2:
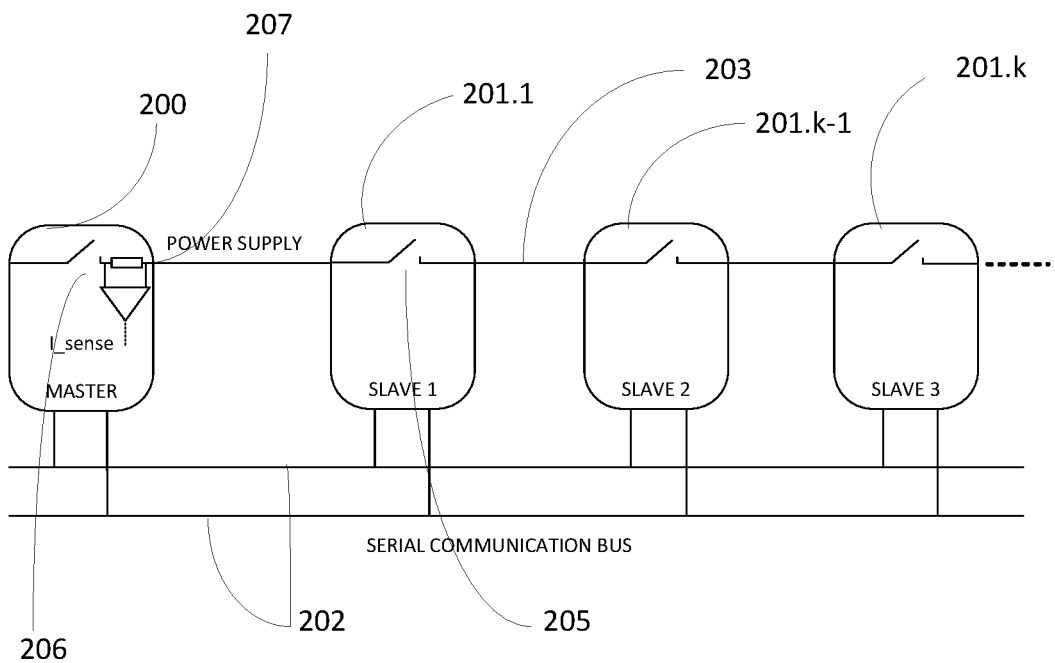
FIG. 2 represents a network system according to some embodiments of the invention.

Referring to FIG. 2, there is shown a network system according to some embodiments of the invention.

The network system comprises a master device 200 and a plurality of N slave devices 201.1, 201.k−1, 201.k, . . . 201.N, N being an integer greater than or equal to 2, and k being an index varying between 1 and N. The slave devices 201 are thereby forming a "Daisy" chain.

The master device 200 is connected to the chain of slave devices 201 via a communication line 202 and a power line 203.

The communication line 202 may comprise several unidirectional lines as shown on FIG. 2, or alternatively only one bidirectional line.

The master device may comprise an activation circuit 206 and a sensing circuit 207.

Figure 1:
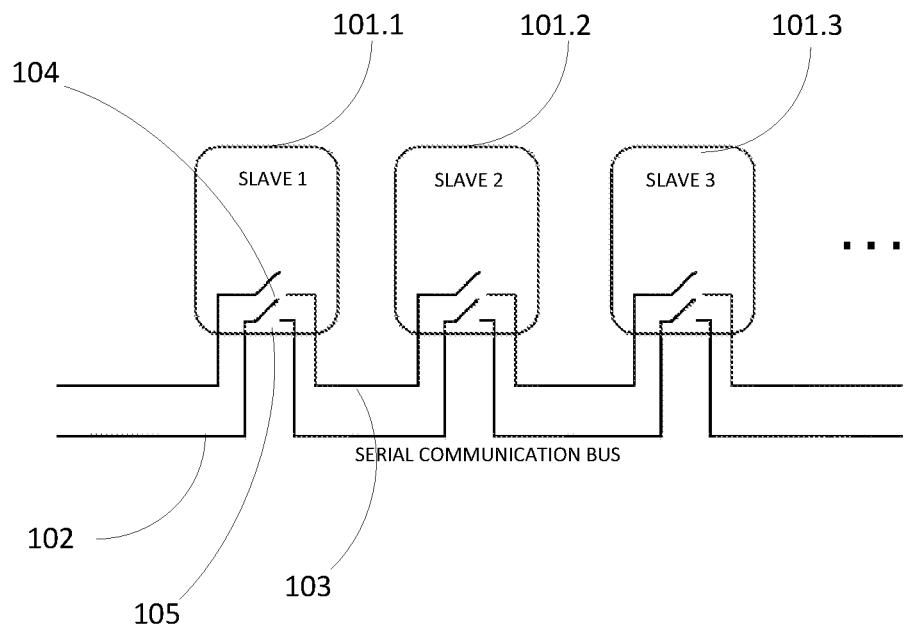
FIG. 1 shows a chain of slave devices according to the prior art.

The activation circuit 206 is configured for activating/deactivating the power line 203. To this end, the activation circuit 206 may be a switch placed between a power source (not represented on FIG. 1) and the slave devices 201.

Each slave device 201.k of index k also comprises a circuit 205 for connecting/disconnecting a slave device of index k+1 (the next one in the Daisy chain).

Figure 3:
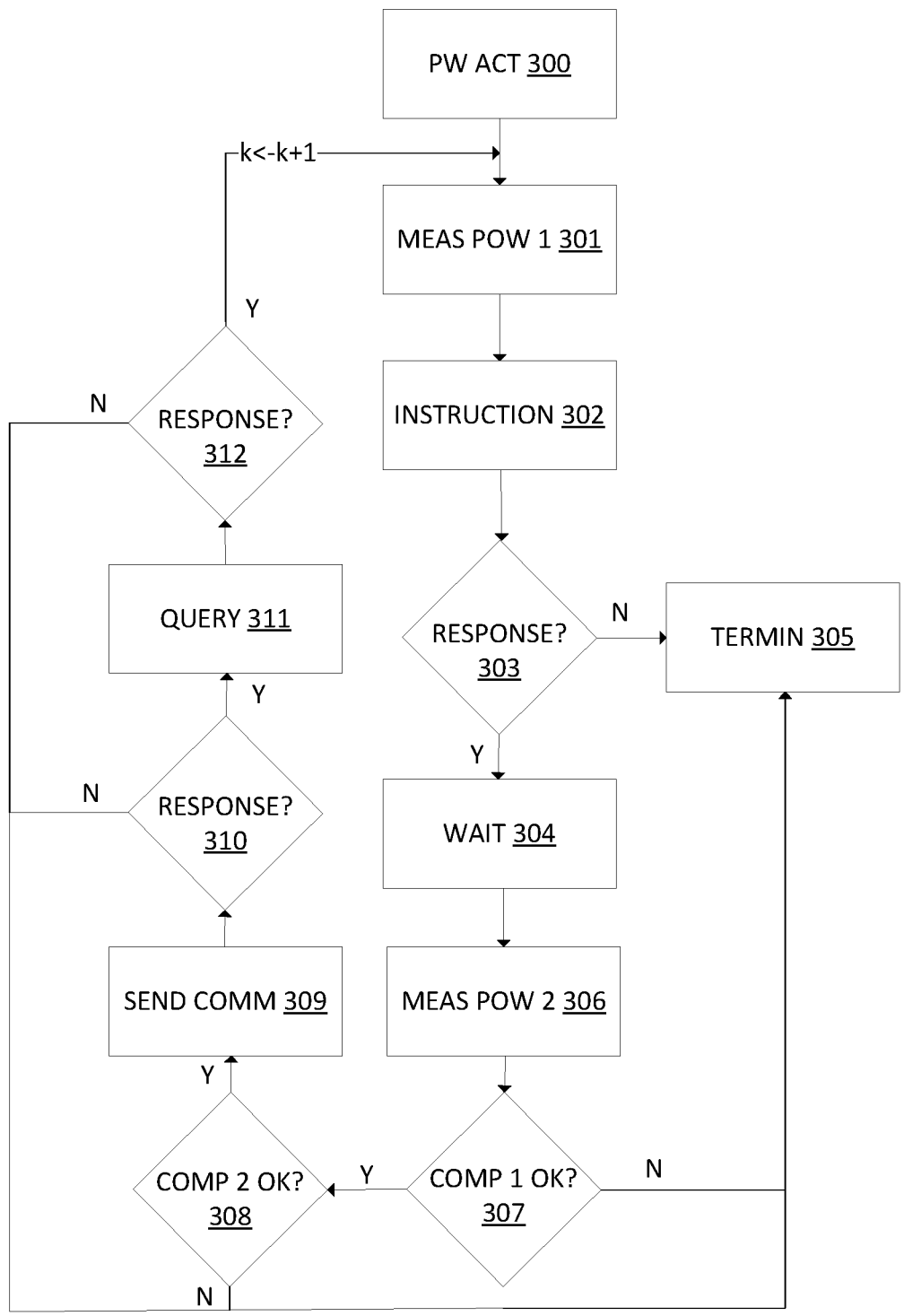
FIG. 3 is a flowchart showing the steps of a method according to some embodiments of the invention.

FIG. 3 is a diagram showing the steps of a method according to some embodiments of the invention.

By default, and initially, all the slave devices have a common default address, such as 0*FE for example.

At initial step 300, the master device 200 activates the power line 203 using the activation circuit 206. For example, the circuit 206 may comprise a switch between the power source and the slave devices 101.

The next steps are iterated for an increasing index k, with an initial value of 1. In what follows, N represents the number of slave devices 201 in the network system. N is not known in advance by the master device 200 and is only determined once the method according to the invention is terminated.

At step 301, the master device 200 optionally measures the power consumed on the power line 203. For example, the master device 200 measures the current drawn on the power line 203. The current drawn on the power line 203 may then be stored in a memory of the master device 200. This measure can be subsequently used to detect a fault in a slave device, according to optional embodiments. For k=1, the master device 200 measures the power on the power line 203 while no slave device is activated.

At step 302, the master device 200 sends an instruction, via the communication line 202, to the slave device of index k−1 to enable the power line 203 of the slave device of index k, via the communication line 202. For k=1, the master device 200 activates its activation circuit 206 to activate the slave device 201.1 without the need to send any instruction.

According to some embodiments, the master device 300 optionally checks whether a response is received from the slave device of index k−1 (for k=1 the master device 200 does not expect any response as no instruction has been sent). To this end, at step 303, the master device 200 checks whether a response is received from the slave device 101.k−1, for example by setting a timer. If a response is received before the timer expires, the method goes to step 304. Else, the method terminates at step 305 and it is concluded that there are no more slave devices in the network and N is equal to k−1.

At step 304, the master device 200 optionally waits until the measures performed by the sensing unit are stabilized. Indeed, once the slave device k−1 is connected to the power line 203, it increases the current drawn on the power line 203 and the current may be stabilized after a certain amount of time.

At step 306, the master device 200 measures the power drawn on the power line 203, such as for example the current drawn on the power line 203.

At step 307, the master device 200 compares the measurement performed at step 306 with the measurement performed at step 301 or alternatively with the measurement performed at step 306 for the previous iteration k−1.

Based on the comparison, it can be detected whether the slave device of index k is correctly activated or not.

For example, the master device 200 checks whether the measurements at iterations k and k−1 are substantially the same (their difference is substantially equal to 0). If so, then the method can be terminated at step 305: it is concluded that there is no slave device of index k and that N is equal to k−1. Else, the method goes to step 307.

At step 308, the master devices 200 checks whether the difference between the compared measurements is below a predetermined threshold. The threshold is representative of a current that can be normally drawn by a slave device. If not (if the difference is above the predetermined threshold), then the method terminates at step 305: it is concluded that the slave device 101.k is faulty. An error message/alarm can be issued at step 305.

At step 309, the master device 200 sends a command to change the common default address of the slave device of index k to a unique address of index k, via the communication line 202. The command is intended to the common default address, as the slave device of index k is the only slave device that is active and that has the common default address (the other slave devices have been previously addressed with unique addresses), such as 0*FE. The common default address can be put in a recipient field of the command (depending on the communication protocol used on the communication line 202). The unique address can have the same format as the common default address (a digit and two letters for example) and may code the index k of the slave device 101.k. For example, the address of the first slave device of index 1 can be 0*AA or 0*01 for example. The unique address of index k can be included in a payload of the command.

At step 310, the master device optionally checks whether a response to the command is received from slave device 101.k. If not, the method terminates at step 305: it is concluded that the unique address of index k has not been correctly assigned.

Else, the method is iterated with next index k+1 and goes back to step 301.

At an optional step 311, and before the method is iterated, a query can be sent to the unique address of index k, to check whether the slave device 101.k is properly configured.

If a response is received at step 312, the method is iterated with next index k+1 and goes back to step 301.

If no response is received at step 312, the method terminates at step 305: it is concluded that slave device 101.k is not enrolled.

Therefore, according to the invention, there is, at any time, only one unaddressed slave device connected to the network (with the common default address). This is because, at startup-up, all the slave devices are deactivated by the master device and that the activations are performed iteratively.

The method provides the advantage to easily measure the current consumption of the devices in the Daisy chain, allowing the master device 200 to determine whether a slave device 201 is behaving within its operating conditions. It can also differentiate between a slave device being absent, operating faulty or normally.

Figure 4:
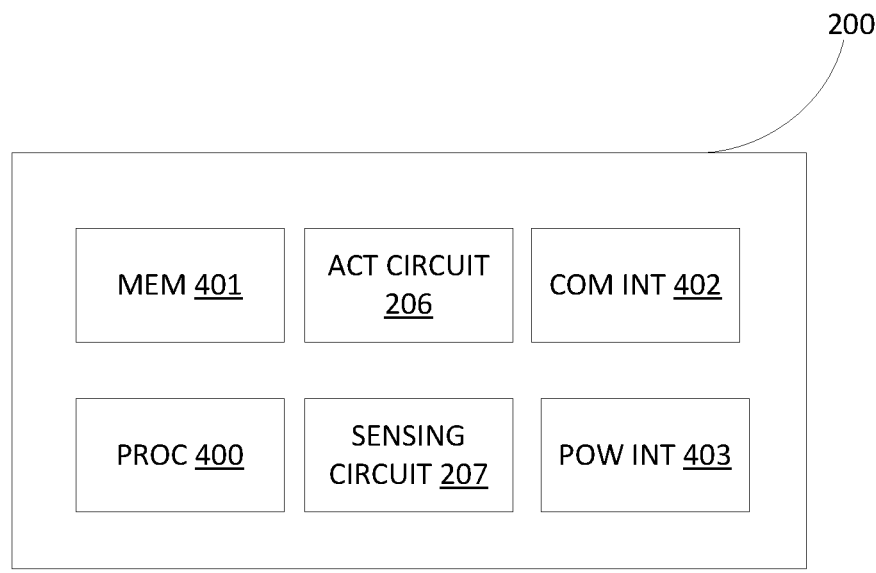
FIG. 4 shows the structure of a master device according to some embodiments of the invention.

FIG. 4 shows a structure of a master device 200 according to some embodiments of the invention.

The master device 200 comprises a memory 401 such as a Read Only Memory, ROM, a Random-Access Memory, RAM, a flash memory or any other type of memory, and a processor 400 that is configured for performing the steps illustrated on FIG. 3. Alternatively, the processor 400 may be replaced by an electronic circuit such as a microcontroller that is configured for performing the steps illustrated on FIG. 3.

The master device 200 may further comprise a communication interface 402 for communicating via the communication line 202 and a power interface 403 between the activation circuit 206 and the slave devices 201.

As explained above, the master device 200 further comprises a sensing circuit 207 configured for measuring the power drawn on the power line 203.

Figure 5:
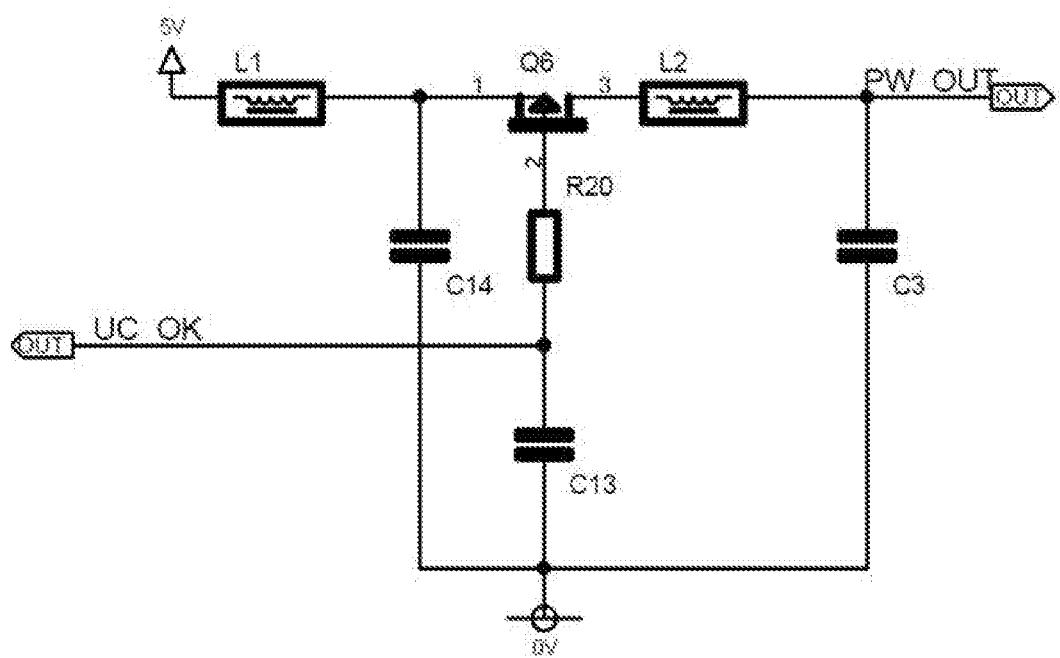
FIG. 5 shows a structure of a connection/disconnection circuit according to some embodiments of the invention.

Referring to FIG. 5, there is shown a structure of the circuit 205 of a slave device 201. This structure is given for illustrative purposes only.

The structure of the circuit 205 comprises:
ferrites L1 and L2 to filter noise and reduce in-rush currents;
a P channel MOSFET Q6 operating as normally closed electronic switch;
capacitors C3, C13 and C14 used as noise and Electro-Magnetic Compatibility, EMC, filtering components;
a resistor R20 to smooth the MOSFET Q6 transition; and
a power output PW_OUT for next slave device before current sensing.

A signal UC_OK is received from the master device 200 to enable/disable the next slave device.

Figure 6:
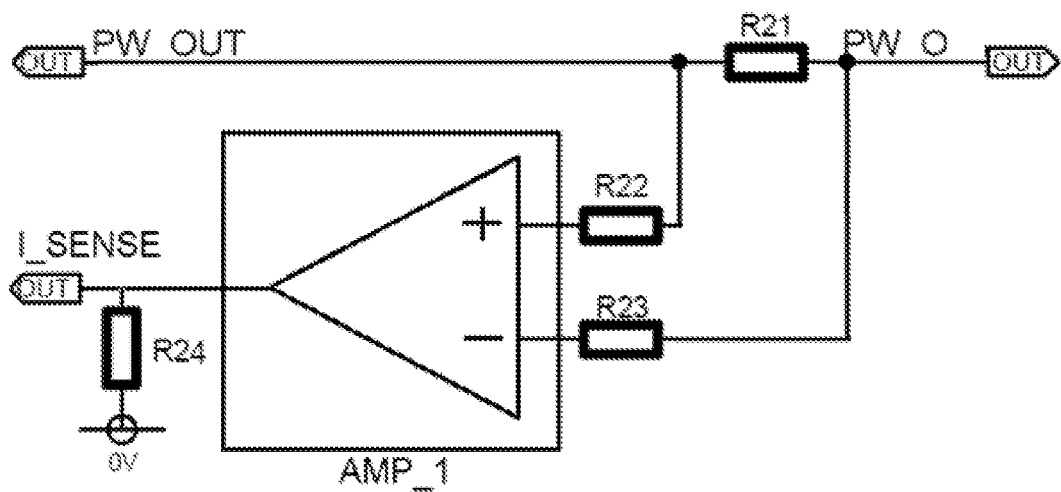
FIG. 6 shows a structure of a sensing circuit according to some embodiments of the invention.

Referring to FIG. 6, there is shown a structure of the sensing circuit 207 according to some embodiments of the invention. This structure is given for illustrative purposes only.

The circuit of the sensing circuit 207 comprises:
a current sensing resistor R21;
a differential amplifier AMP_1 to condition the current measurement;
bias current balancing resistors R22 and R23 for the amplifier AMP_1;
a power output PW_O, such as the power interface 403, towards the first slave device 201; and
a power output PW_OUT coming from the activation circuit 206.

A sensed current signal I_SENSE is sent to the processor 400 of the master device 200.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for addressing a slave device in a network system comprising a master device and a plurality of slave devices, wherein the slave devices have a common default address in an unaddressed state and wherein the master device and the plurality of slave devices are connected in chain via a power line and a communication line,
wherein each slave device is indexed by an index greater than or equal to 1, the slave device of index 1 being connected to the master device,
wherein, to address the slave device of index k, k being equal to or greater than 2, the method comprises the following operations performed by the master device:
instructing, via the communication line, the slave device of index k−1 to activate the power supply of the slave device of index k via the power line;
measuring, by the master device, a value of a current consumption on the power line;
determining, by the master device, a difference between the measured value and a previous value; and sending, by the master device to the common default address on the communication line, a command to change the common default address of the slave device of index k to a unique address of index k, if the difference between the measured value and the previous value is within a predetermined range.

2. The method according to claim 1, wherein after activation of the slave device of index k, the method comprises, based on a comparison between the measured value and the previous value, determining whether the slave device of index k is correctly activated or not.

3. The method according to claim 1, wherein, for the slave device of index 1, the method comprises the following operations:
   measuring the current consumption on the power line and storing said current consumption as a previous value;
   activating the slave device of index 1 via the power line;
   measuring the current consumption on the power line after the slave device of index 1 has been activated.

4. The method according to claim 1, wherein the command to change the common default address of the slave device of index k is sent if an acknowledgment has been received from the slave device of index k−1 following the instruction sent on the communication line.

5. The method according to claim 1, further comprising sending a presence query to the unique address of index k, and, upon receiving of an acknowledgment to the presence query from the slave device of index k, repeating the operations of the method for the slave device of index k+1.

6. The method according to claim 1, wherein the unique address of index k is a code determined based on index k.

7. A non-transitory computer readable storage medium, with a computer program stored thereon, said computer program comprising instructions for, when executed by a processor, carrying out the steps of a method according to claim 1.

8. The method according to claim 2, wherein the command to change the common default address of the slave device of index k is sent if the difference between the measured value and the previous value is substantially different from zero.

9. The method according to claim 2, wherein the command to change the common default address of the slave device of index k is sent if the difference between the measured value and the previous value is within a predetermined range, else the master device issues an error message.

10. A master device for addressing a slave device in a network system comprising the master device and a plurality of slave devices, wherein the slave devices have a common default address in an unaddressed state, the master device comprising:
    a first interface to access a power line for powering the slave devices;
    a second interface for communicating with the slave devices via a communication line;
    wherein each slave device being indexed by an index greater than or equal to 1, the master device being connected to the slave device of index 1
    wherein the master device comprises a processor that implements, for addressing the slave device of index k, k being equal to or greater than 2, the following operations:
        instructing, via the communication line, the slave device of index k−1 to activate the power supply of the slave device of index k via the power line;
        measuring, by the master device, a value of a current consumption on the power line;
        determining, by the master device, a difference between the measured value and a previous value; and
        sending, by the master device to the common default address on the communication line, a command to change the common default address of the slave device of index k to a unique address of index k, if the difference between the measured value and the previous value is within a predetermined range.

11. A system comprising a master device according to claim 10 and a plurality of slave devices connected in chain to the master device.

* * * * *